March 15, 1966 W. J. DAILEY ETAL 3,240,520

QUICK RELEASING HIGH STRENGTH CONNECTOR

Filed Nov. 16, 1962 3 Sheets-Sheet 1

INVENTORS
WILLIAM J. DAILEY
BY JACK C. HELF

ATTORNEY

March 15, 1966 W. J. DAILEY ETAL 3,240,520
QUICK RELEASING HIGH STRENGTH CONNECTOR
Filed Nov. 16, 1962 3 Sheets-Sheet 2
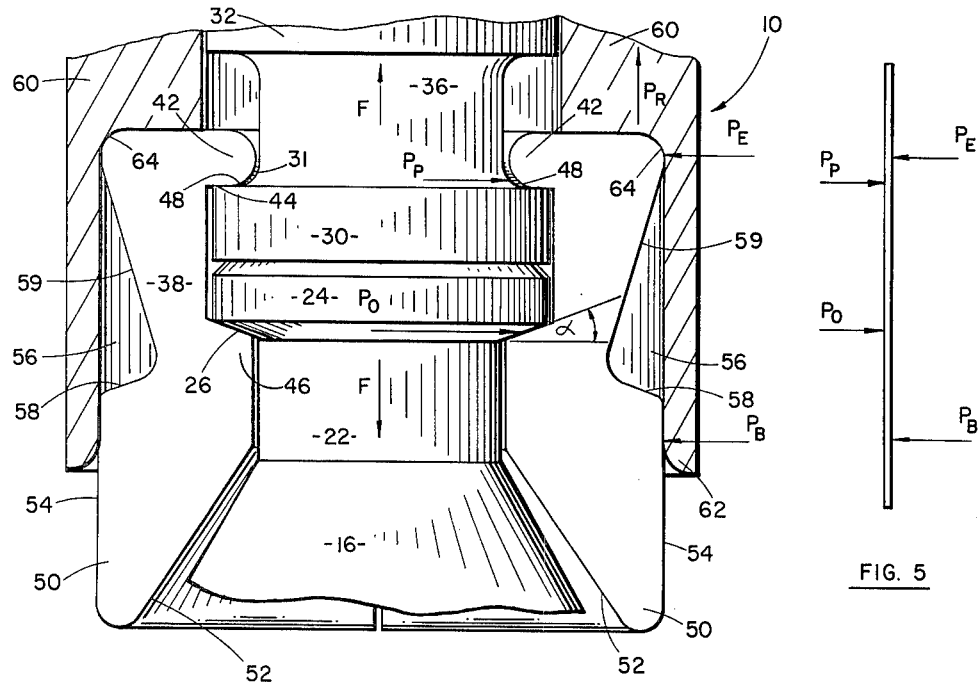
FIG. 4
FIG. 5
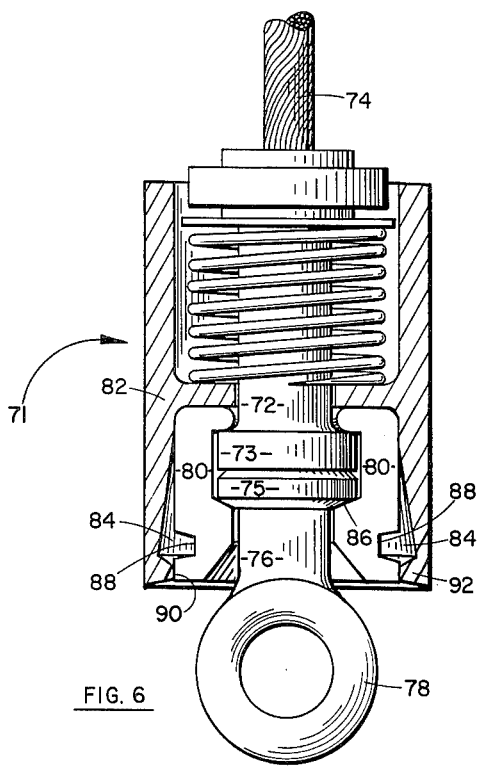
FIG. 6
INVENTORS
WILLIAM J. DAILEY
JACK C. HELF
BY
ATTORNEY March 15, 1966   W. J. DAILEY ETAL   3,240,520
QUICK RELEASING HIGH STRENGTH CONNECTOR
Filed Nov. 16, 1962   3 Sheets-Sheet 3

INVENTORS
WILLIAM J. DAILEY
BY JACK C. HELF

ATTORNEY

United States Patent Office 3,240,520
Patented Mar. 15, 1966

3,240,520
QUICK RELEASING HIGH STRENGTH
CONNECTOR
William J. Dailey, Santa Fe Springs, and Jack C. Helf,
Rossmoor, Calif., assignors to North American
Aviation, Inc.
Filed Nov. 16, 1962, Ser. No. 238,171
5 Claims. (Cl. 287—130)

This invention relates to a quick-releasing connector capable of supporting large loads.

In many applications it is necessary that a coupling or connector be provided in the system between a rigid support, for example, and a large load. For example, the connector could be incorporated in a system for supporting cargo in land, sea or air carriers where a quick acting release is desired for ready offloading. Lug type supports are also useful for accurate air dropping of rescue equipment, military supplies, bombs and missiles. Support of heavy objects for testing procedures is often desirable. Quick disconnects may be employed on heavy duty tow cables. Quick disconnect high strength couplings are capable of use in arresting cables for landing aircraft. Quick disconnects are required on missile launching to restrain the missile during engine warmup and effect a quick and uniform release upon launching. Connectors are required in cables used for cargo securing on ship, rail and truck transportation. Some types of heavy duty hoisting equipment may involve use of quick releasing connectors.

In some of these applications it is also necessary to release the load quickly and with a minimum of control force. In a good many locations it is also necessary that the connector provided have a relatively small weight for the strength involved and also a diameter not greatly larger than the diameter of the supporting shafts. It may also be desirable to have a connector that occupies a relatively short distance along the length of the shafts. For certain applications it is necessary to provide an arrangement whereby the shafts may be rapidly disconnected while under high load.

Any of the previously available connector mechanisms have involved complicated structures that are relatively heavy and involve a substantial actuating force to release heavy loads. In addition the previously available devices have been subject to excessive wear and breakdown of the load supporting hooks when subjected to opening while under a heavy load. These connectors have all had comparatively long clamping dogs for securing engagement to carry loads. A large amount of pivotal movement of the dogs has been required for the clamping dogs to disengage from the shafts. The load supporting hooks have gripped only a portion of the shafts so that only a small area of contact is present to carry the load. Many of the prior art connectors have involved the use of a complex multiple lever system to actuate the load supporting hooks. Previous connectors that employed restraining sleeves on supporting hooks or clamping dogs have required a considerable movement of the sleeve in order to accomplish disengagement of the dogs. The prior art lug type connectors have not permitted very quick release of high tensile loads.

Accordingly, it is a broad object of this invention to provide a high-strength quick-releasing connector eliminating these disadvantages.

In carrying out the principles of the invention, according to a preferred embodiment, mutually abutting coaxial shafts are provided with flanged portions on the abutting ends of the shafts. These shafts are substantially circumscribed by a plurality of short arcuate floating clamping dogs in the form of segments of an annular figure of revolution. This circumscription permits the exertion of very high tensile loads on the connector and release of this load with a minimum of wear. The flanges act in cooperation with the clamping dogs to transmit the required longitudinal forces. A tapered fillet or camming surface between one of the shafts and its flanged portion cooperates with a mating tapered portion on the clamping dogs as a means for camming the dogs into disengagement. By proper selection of the camming angle, rapid and smooth opening of the connector is obtained. A slidably movable sleeve circumscribes the dogs and cooperates with an external cylindrical bearing portion on the clamping dogs to prevent pivotal movement of the dogs, thereby holding the dogs in engagement with the two flanged portions. An external circumferentially extending recess on the clamping dogs cooperates with the end of the slidably movable sleeve when it is moved in one direction to allow the clamping dogs to be cammed into disengagement. The cylindrical bearing portion on the dogs has at least a portion extending further along the axis of the shaft from the interface of the two shafts than the tapered fillet is from the interface of the two shafts. The load on the shafts acting through the angularly disposed fillet results in a force tending to cam the clamping dogs into a disengaged position when the sleeve is moved into a position so that the end of the sleeve cooperates with the recess in the dogs. By having a bearing portion of the clamping dogs beyond the camming surface, the radial force on the clamping dogs is minimized and the constraining sleeve can be moved with a minimum of force. Providing a sharply recessed portion in the clamping dogs permits rapid pivoting of the dogs into disengagement thereby minimizing the wear on the supporting hooks when the connector is disengaged while under a heavy tensile load.

It is therefore a broad object of the present invention to provide a quick-releasing high strength connector.

It is another object of the present invention to provide a means for releasing a heavy load by means of a small actuating force.

It is a further object of the present invention to permit quick release of heavy loads by means of hand operation.

It is a still further object of this invention to provide a simple, high reliability, quick-releasing, high strength connector.

It is an additional object of this invention to provide a quick-releasing connector that has sufficient strength to support forces which would be capable of causing failure of the shafts external to the connector.

Other objects and many of the attendant advantages of this invention will be readily appreciated as the same becomes better understood by reference to the following detailed description when considered in connection with the accompanying drawings wherein:

FIG. 4 is a fragmentary view indicating operating principles of the invention.

FIG. 5 is a schematic diagram of the forces on the dogs of the connector.

FIG. 6 illustrates another embodiment of a quick-releasing high strength connector.

Throughout the drawings and specification like reference numerals refer to like parts.

Figures 1, 2, 3:
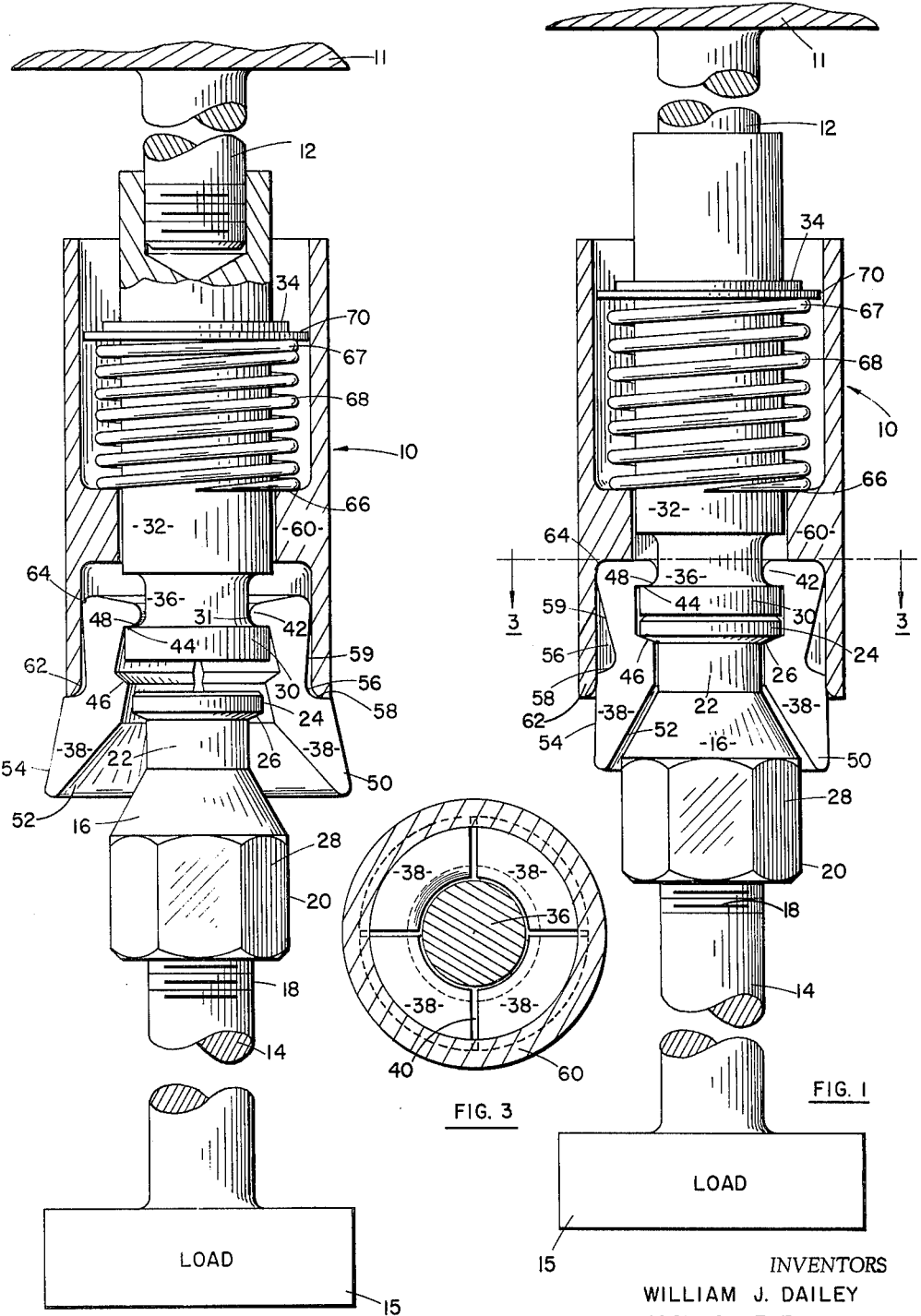
FIG. 1 is a sectional view of a connector with the two shafts engaged.
FIG. 2 is a sectional view of a connector with the two shafts in disengagement.
FIG. 3 is a view taken on section line 3—3 of FIGURE 1.

In carrying out the principles of this invention as illustrated in FIGURES 1, 2 and 3, there is provided a high strength quick-releasing connector 10 of a type which is supported from a rigid structure 11. A load 15 is provided supported by the connector. The load is one which is desirably released by a small force. Thus, for example, it can be rescue equipment to be dropped from an aircraft over the scene of a disaster, or an experimental packaging scheme dropped from a test tower to determine its impact characteristics. This connector 10 comprises a first shaft or rod 12 which is adapted to be secured to a supporting structure 11 and a second shaft or rod 14 extending to the load 15 which is releasably dependent from the support. In this embodiment of the quick-releasing connector 10 a fitting shaft or rod 16 is provided on the second shaft 14 by means of a threaded joint 18. The fitting shaft 16 has an enlarged portion 20 to provide strength at the region of the threaded joint 18, a reduced or body portion 22 of substantially the same diameter as the shafts 12 and 14 and an enlarged flanged end 24.

Between the flanged end or head 24 and the reduced portion 22 a fillet or camming surface 26 is provided. This fillet 26 is in the form of a truncated cone with its apex toward the enlarged portion 20 of the fitting shaft 16; that is, the fillet surface 26 is inclined inwardly of the shafts and away from the first shaft 12. This fillet or camming surface 26 transverts a tensile force along the axis of the connector 10 into an outwardly directed transapical component and a component parallel to the axis of the connector 10. The angular relationship of the fillet 26 to other components of the connector 10 are discussed below. A hexagonal portion 28 is provided on the enlarged portion 20 of the fitting shaft 16 in order to allow tightening of the threaded joint 18.

The first shaft 12 also has a flanged end or head 30 which abuts the flanged end 24 of the second shaft 16. An arcuate fillet 31 is provided between the flange 30 and the body portion 36 of the first shaft 12. An enlarged portion 32 is also provided on this shaft 12 for increased strength at the region where a snap ring 34 is attached. This enlarged portion 32 also extends along the shaft 12 to serve as a guide for an axially shiftable sleeve 60 to be more particularly described below. A reduced or body portion 36 is also provided between the enlarged portion 32 and the flange 30 of substantially the same diameter as the reduced portion 22 on the second shaft 16.

Four clamping dogs 38 substantially circumscribe the aforementioned flanges 24 and 30. These dogs 38 are in the form of longitudinal segments of an annular figure of revolution. Except for the small amount of space 40 (FIGURE 3) between adjoining dogs, these dogs 38 completely circumscribe the flanges 24 and 30. The embodiment shown in FIGURES 1, 2 and 3 has a total of four clamping dogs 38. However, it is clear that a different number of dogs can be used by one skilled in the art to substantially circumscribe the flanges. The several clamping dogs 38 are identical and each dog 38 comprises a first ear 42 which is in engagement with the head 30 of the first shaft 12 on a bearing surface 44 of the head. A second ear 46 of the dog is in engagement with the fillet 26 on the flange 24 of the second shaft 16. The engagement of the two ears 42 and 46 with the respective flanges 24 and 30 serves to secure the two shafts 12 and 16 together. The first ear 42 has an arcuate portion 48 adjoining the bearing surface 44 which provides a fulcrum for the dog.

Each clamping dog has an extended portion 50, the inside surface 52 of which is in the form of a truncated cone the apex of which extends toward the first shaft 12. This internal conical surface 52 serves as a guide for the flange 24 on the second shaft 16 to facilitate the interconnection of the shafts. The insertion of the second shaft 16 into the connector 10 when the sleeve 60 is positioned in the connector release position as illustrated in FIGURE 2 provides a radial camming force on the clamping dogs because of this conical surface 52. The camming force will pivotally move the clamping dogs into a position so that the flanged portion 24 on the second shaft can be inserted into the connector.

The periphery of the assemblage of the clamping dogs is formed with a cylindrical bearing surface 54 extending circumferentially around the assemblage of dogs. This bearing surface 54 is displaced axially further from the first shaft 12 than the camming fillet 26 is from the first shaft 12. A recess 56 is rebated inwardly of the cylindrical portion 54 on the clamping dog 38. This recess 56 also extends circumferentially of the assemblage of clamping dogs 38. An end surface 58 of the recess 56 extends further axially from the first shaft 12 than the camming fillet 26 is from the first shaft 12.

The end surface 58 of the recess 56 is at an angle of more than 90° from the bearing surface 54 of the clamping dog 38. The surface 58 of the recess 56 is at an angle of substantially 90° from a second surface 59 of the recess 56. The angular relationship of the end surface 58 to other portions of the clamping dog 38 provides buttressing for the bearing surface 54 and results in smoother kinematics when the dogs pivot into the disengaged position as shown in FIGURE 2.

In the embodiment illustrated in FIGURES 1–4 the clamping dogs are manufactured by a simple and economical technique. The internal and external surfaces of the figure of revolution are made from a single piece in a single series of cutting operations on a lathe. Saw cuts are made longitudinally across the resulting cylinder at 90° from each other resulting in four identical clamping dogs. These four dogs comprise the assemblage of clamping dogs in the connector 10. Thus the clamping dogs 38 substantially circumscribe the two flanges 24 and 30. The only diminution from complete circumscription is the kerf. This results in the small spaces 40 between the clamping dogs 38 (FIG. 3). The nearly total circumscription of the flanges 24 and 30 results in a high area of contact between the ears 42 and 46 and the bearing surface 44 and the fillet 26 respectively. By having a large area of contact and a large cross-sectional area of the clamping dogs 38, the total load bearing capacity of the connector 10 is greater than the load bearing capacity of the shafts 12 and 14. The large area of contact between the ear 46 and the fillet 26 minimizes the wear and breakdown of the edges when the connector is disconnected under high loads. By having the dogs floating and pivoting on the arcuate portion 48 rather than pivoting on a pin, the load that can be supported by the connector is quite large since the full cross section of the ear 42 is available to support the load, rather than the mere cross section of a pivot pin.

The axially slidably movable sleeve 60 circumscribes the clamping dogs 38. This sleeve 60 has an end portion 62 extending across the recess 56 when the sleeve is in the normal, closed position constraining the dogs in securing engagement with the flanges as illustrated in FIGURE 1. The end portion 62 engages with the cylindrical bearing surface 54 of the clamping dog 38 to secure the dogs in engagement. This end portion 62 also engages with an edge 64 of the clamping dog 38 to prevent radial motion of the clamping dog 38 at the end 48 about which it is free to pivot. An internal shoulder 66 is provided in the sleeve 60 to engage with a spring 68 which circumscribes the enlarged portion 32 and urges the sleeve 60 in a direction away from the first shaft 12. The end 67 of the spring 68 engages with a collar 70 urging the collar 70 towards the snap ring 34 which is fixedly secured to the enlarged portion 32 of the shaft 12.

FIGURE 1 is a cross-section of the connecter 10 with the sleeve in its normal or closed position constraining the clamping dogs 38 in engagement with both the bearing surface 44 and the camming fillet 26. The dogs are constrained in engagement with the camming fillet 26 by the sleeve 60. The spring 68 urges the sleeve 60 in a direction away from the first shaft 12 and toward its closed position wherein the sleeve 60 prevents outer pivotal movement of the dogs 38 about their fulcrum 48.

FIGURE 3 is a cross-section of the connector of FIGURE 1. Four clamping dogs 38 substantially circumscribe body portion 36 of the shaft 16 and are constrained in position by the sleeve 60.

FIGURE 2 shows the connector 10 with the slidably movable sleeve 60 moved toward the first shaft 12 in such a way as to compress the spring 68. The end portion 62 of the sleeve is withdrawn from engagement with the cylindrical portion 54 of the clamping dogs 38. The typical clamping dog 38 is therefore partially freed from constraint and can pivotally move around the arcuate portion 48. The end 62 of the sleeve 60 now cooperates with the recess 56 on the clamping dog 38 to provide clearance for the pivotal movement of the dog 38. This pivotal movement of the clamping dog 38 releases the fillet 26 from engagement with the clamping dog 38 and permits disengagement of the two shafts 12 and 14.

When an axial force is applied to the second shaft 14, a radial force on the typical clamping dog 38 will result because of the angular disposition of the fillet 26 on the head 24 as is more fully described hereafter. The camming action of this fillet 26 on the clamping dog 38 provides a force to pivotally move the clamping dog 38 to a position of disengagement from the head 24 when the sleeve 60 is slidably moved to the position shown in FIGURE 2. The circumferentially extending recess 56 provides clearance for the end 62 of the sleeve 60 and permits the pivotal movement of the clamping dog 38.

The typical clamping dog 38 pivotally moves on the arcuate portion 48 of the ear 42. A relatively small amount of rotational displacement is involved so that the contact area of the arcuate portion 48 with the bearing surface 44 is substantially constant throughout the rotation, thus no substantial deformation of any surface occurs upon operation of the connector 10. In other embodiments of the invention a different number of clamping dogs can be provided to circumscribe the flanges to allow any desired degree of contact. Such modification using a number of dogs different from the described embodiment is well within the talents of one skilled in the art and is one of obvious design equivalence.

FIGURE 4 shows a single typical clamping dog 38 and a sufficient portion of the body portions 36 and 22 and their respective flanges 30 and 24 and the circumscribing sleeve 60 to indicate the operating principles of the invention. The operating forces on the connector are indicated by the arrows in FIGURES 4 and 5. FIGURE 5 is a schematic diagram of the forces on the dog 38. Arrows F indicate the axial tensile force from the connector shafts 12 and 14; $P_o$ is the opening force on the clamping dog 38 due to the camming action of the fillet 26; $P_p$ is the radial force, if any, exerted at or near the arcuate portion 48 of the dog 38 by the flange 30; $P_b$ is the bearing force which is exerted between the cylindrical surface portion 54 of the clamping dog 38 and the end portion 62 of the sleeve 60; $P_e$ is the radial force between the end of the sleeve and the edge 64 of the clamping dog; $P_r$ is the force required to slidably move the sleeve 60 along the axis of the connector 10. As used in the analysis herein the calculation of the sliding force $P_r$ disregards the compressive strength of the spring 68. The angle between the surface of the fillet 26 and a plane normal to the axis of the shafts 12 and 14 is designated α.

The opening force $P_o$ depends on the angle α, the axial load F on the shafts and the coefficient of static friction between the fillet 26 and the clamping dog 38 according to the relationship $$P_o = F \tan \alpha - F \cos \alpha f_0$$

where $f_0$ is the coefficient of friction. The force $P_r$ necessary to slide the sleeve 60 is given by the relationship $$P_r = (P_o + P_p) f_1$$

where $f_1$ is the coefficient of friction between the bearing surface 54 and the sleeve end 62. As explained hereafter, in the embodiment illustrated in the FIGURES 1–4, the radial force $P_p$ is zero and the opening force $P_o$ is the only outwardly directed radial force on the clamping dog 38. This opening force is counteracted by the bearing force $P_b$ between the cylindrical surface portion 54 and the end portion 62 of the sleeve 60 and $P_e$, the radial force between the end 62 of the sleeve 60 and the edge 64 of the clamping dog 38. The coefficient of friction $f_1$ for both $P_b$ and $P_e$ is the same since the same materials of construction are used. The resultant of $P_b$ and $P_e$ is exactly equal and opposite to $P_o$. With a given geometry of the camming surface and particular materials of construction it is possible to calculate the opening force $P_o$ and also the force $P_r$ required to slidably move the sleeve for a given load F on the shafts. For example, a total tensile load of 10,000 pounds on the shafts will give the values in Table I for the opening force $P_o$ and the sliding force $P_r$ for various fillet angles α. In this table the accepted value of the coefficient of friction of bare steel on bare steel is assumed at 0.11. Other values for the load, the angle and the coefficient of friction can be readily substituted in the above equations. It will be obvious to one skilled in the art that other values for the sliding force $P_r$ could be obtained by changing the materials of construction or by providing lubrication on some or all of the bearing surfaces involved in the connector 10.

Table I

| α, degrees | $P_o$, lbs. | $P_r$, lbs. |
|---|---|---|
| 7 | 136 | 15 |
| 8 | 316 | 35 |
| 10 | 680 | 75 |
| 12 | 1,040 | 114 |
| 15 | 1,617 | 178 |
| 20 | 2,606 | 287 |
| 25 | 3,666 | 403 |
| 30 | 4,821 | 530 |

From the above data it is apparent that an angle α of much less that 7° will produce insufficient opening force $P_o$ to properly swing the dogs 38 into a position of disengagement from the fillet 26. It is desirable to keep the angle α small so that the sliding force $P_r$ of the sleeve 60 is relatively low for ease of operation. Conversely a large angle α is desirable to produce a large opening force $P_o$ which will more rapidly accelerate the clamping dogs 38 into disengagement from the fillet 26 than would a small angle α. The rapid disengagement of the clamping dogs 38 from the fillet 26 is desirable to minimize the wear and breakdown of the edges of the mating parts. A compromise between the desirably small actuating force and the desirably high speed of disengagement is present in determining the best angle to be used for a particular load.

It has been found, for example, that for a relatively light load such as 10,000 pounds, an angle α between 10° and 20° gives an action smooth and fast enough to substantially avoid wear on the connector and afford a long service life and only hand power is required for sliding the sleeve. When the load is as high as 20,000 pounds an angle α between 12° and 15° gives the optimum combination of actuating force and quick disengagement characteristics. When the angles are higher than the ranges above, the actuating force is too large for hand operation or hand operation assisted by short simple levers. When smaller angles are employed the acceleration of the shaft 14 under the influence of the load F is sufficiently high that the dogs 38 have insufficient time to travel into disengagement and breakdown of the edges of the camming ear 46 and the fillet 26 limits the operating life of the connector.

The forces on a typical dog 38 as illustrated in FIGURE 4 are shown schematically in FIGURE 5. Because of the geometrical relationship of the camming ear 46 and the cylindrical bearing surface 54, the opening force $P_o$ is counteracted principally by the bearing force $P_b$ and to a smaller extent by the force $P_e$ between the edge 64 of the clamping dog 38 and the sleeve 60. The bearing surface is further axially from the first shaft 12 than is the cooperative interface between the fillet 26 and the camming ear 46. The moments induced by the opening force $P_o$ due to the locations of the contacts with the sleeve 60 are equally and oppositely balanced by the forces $P_b$ and $P_e$. Because of this exact balance the radial force $P_p$ at the pivot point 48 of the dog 38 is zero, and the deg 38 can pivot into disengagement rapidly and with no binding. By having short dogs rapid disengagement is possible, since for a given strength, less mass need be moved to pivot the dogs. By arranging the bearing surface and release recess as described the force tending to pivot the dogs into disengagement is utilized to its maximum and the sliding force required on the constraining sleeve is a minimum.

Because of the nearly full circle area of contact between the ears on the clamping dogs in the illustrated embodiments and the flange shoulders on the shafts, a very large load can be supported by the illustrated connectors. The large area of contact is a direct consequence of the use of a fulcrum for the clamping dogs external to the dogs, that is, the strength of the connector is enhanced by having the dogs floating rather than constrained by pins for pivotal movement. The strength of the connector can thus be limited by the ultimate strength of the shafts rather than the shear strength of any pins used as fulcrums for the clamping dogs.

A quick-releasing high strength connector of the type illustrated embodying the principles of this invention is operated in the following manner. The slidably movable sleeve is moved in one direction so that the clamping dogs are no longer constrained by the end of the sleeve and are free to move pivotally in an outward direction. A suitable headed shaft with a camming surface as described is then inserted into the connector, the end of this shaft pressing against the internal conical portion of the clamping dogs forcing the dogs into an outward and disengaged position. When the headed shaft is fully inserted, gravity causes the floating dogs to pivotally move into the engaged position. If it is found in a particular application that gravity is insufficient to engage the dogs with the headed shaft, a small urging force in the form of a small spring can readily be added to the connector to cause such engagement. A spring of this type is illustrated hereinafter in FIGURE 7. In the illustrated embodiment operating in a vertical position such urging force has not been found to be necessary. When the dogs are engaged with the inserted shaft head the sleeve is then allowed to return to its position constraining the dogs into securing relationship with the heads as urged by a spring in the connector. The dogs are thus constrained in engagement with the camming surface on the inserted shaft. An axial tensile force may then be applied to the shafts and is transmitted therebetween by the connector.

The high strength connector is so constructed that it is possible to disengage the two shafts when under a heavy applied load. A relatively slight force is required and wear on the connector is at a minimum. A relatively small force is applied to the sleeve to slidably move it in one direction. This force need be sufficient only to overcome the friction between the dogs and the sleeve and the urging force of the spring. The sleeve is moved into a position where the constraining force on the clamping dogs is removed and the dogs are free to pivot into a position of disengagement from the head of the inserted shaft. Because of the camming force between the fillet on the inserted shaft and the clamping dogs, the dogs will be rapidly pivoted into disengagement from the head and the load on the connector is quickly released.

In the embodiment shown the connector has been manually operated to the extent that the slidable movable sleeve is moved by hand to release the connector. It is contemplated and should be readily apparent that operation of the sleeve can be achieved by means of hydraulic mechanisms, levers, inclined ramps or other mechanical devices.

FIG. 6 illustrates another embodiment of a quick-releasing high strength connector 71 employing the principles of the invention. In this embodiment two coaxial mutually abutting shafts 72 and 76 are provided. One of the shafts 72 is adapted to be connected to a high strength cable 74. This cable 74 can be attached to any of a variety of structures or can be used, for example, for a towing application or for aircraft arresting. The second shaft 76 has a loop or ring 78 integral with the shaft 76. The ring 78 can obviously be used for any of a number of fastening or hoisting applications. The general structural elements of the two shafts 72 and 76 are analogous to the similar features of shafts 12 and 16 of the embodiment of FIGURES 1–4. A difference is present, however, in this connector 71 in the geometry of the clamping dogs and the slidably movable sleeve. A plurality of clamping dogs 80 is provided in the connector 71 in a manner analogous to the dogs 38 in the connector 10. These clamping dogs collectively substantially circumscribe the flanged ends 73 and 75 of the shafts 72 and 76 respectively. A sleeve 82 is provided with an internal rebated portion or recess 84. An external recess or rebated portion 88 extends circumferentially of the clamping dogs 80. This recess 88 cooperates with the end portion 92 of the sleeve 82 when the sleeve 82 is slidably moved toward the first shaft 72. A cylindrical bearing surface 90 extends circumferentially on the external portion of the clamping dogs 80. This bearing surface 90 bears against the end 92 of the sleeve 82 to constrain the clamping dogs 80 into securing engagement with the flange 75, when the sleeve 82 is in its normal, closed position as shown in FIGURE 6.

When the sleeve 82 is slidably moved toward the first shaft 72 the end portion 92 of the sleeve 82 no longer cooperates with the bearing surface 90 and the dogs 80 can pivotally move into disengagement from the flange 75. The recess 88 in the dogs cooperates with the end portion 92 of the sleeve to allow this pivotal movement. The recess 84 in the sleeve 82 provides clearance for the clamping dogs 80 upon pivotal movement into a position of disengagement of the clamping dogs from the flange 75. A conical camming surface 86 is provided between the flange 75 and the shaft 76. An axial tensile force on the connector 71 is partially resolved into a transapical force which tends to pivotally force the dogs 80 into outward pivotal movement. In order to provide ease of operation and suitable kinematics of opening, the bearing surface 90 is located further axially from the first shaft 72 than the camming surface 86 is from the first shaft 72. Likewise the rebated portion 88 is located further axially from the first shaft 72 than the camming surface 86 is from the first shaft 72. The angular relationship between the caming surface 86 and the axis of the connector 71 is similar to the relationship discussed above in relation to the connector 10 shown in the embodiments of FIGURES 1–4.

Figure 7:
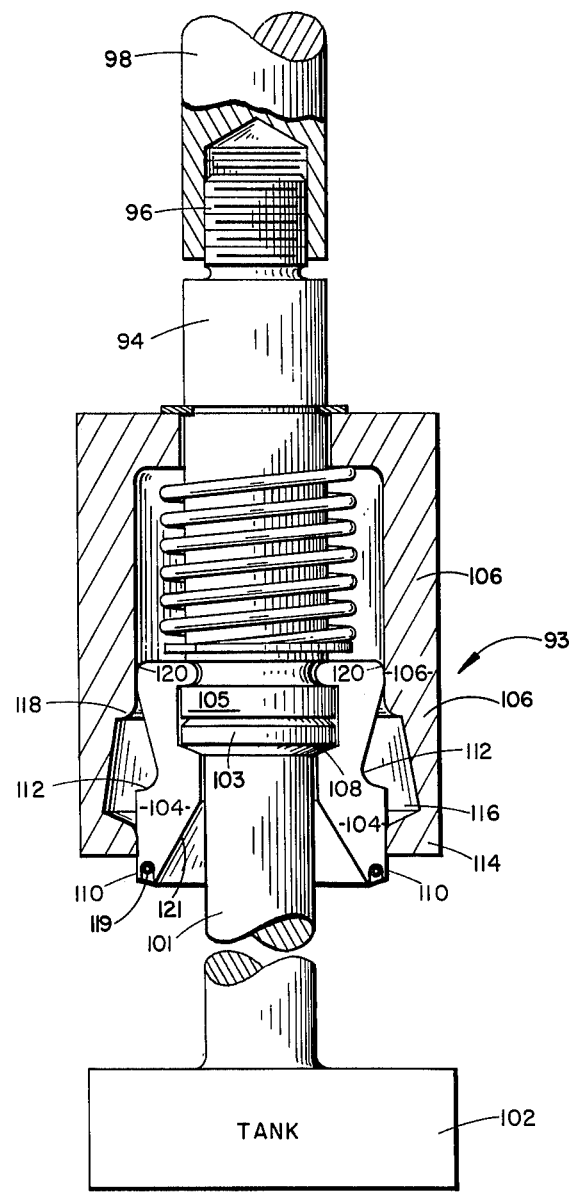
FIG. 7 illustrates a third embodiment of a quick-releasing high strength connector.

FIGURE 7 shows still another embodiment of a quick-releasing connector 93 employing the operating principles of this invention. The connector 93 differs from the connectors 10 and 71 principally in the direction of slidable movement of the sleeve compared with the movement of the sleeves in the other embodiments. Whereas the sleeves 60 and 82 are slidably movable toward the ends of the dogs 38 and 80, respectively, about which pivotal movement occurs in order to permit the pivotal movement; a sleeve 106 is provided which is slidable in the opposite direction to perform the same function. This connector 93 comprises a first shaft 94 which further comprises a threaded fitting 96 for attachment to any of a variety of supporting structures, such as, for example, a shaft 98. A second shaft 101 is provided with a flanged end 103 in aligned abutment with a flanged end 105 of the shaft 94. The second shaft 101 is connected with a tank 102, which tank is releasably carried by the supporting structure 98 by means of the illustrated connector 93. The general structural features of the two shafts 94 and 101 are similar to analogous structural features on the two shafts 12 and 16 of the connector 10 illustrated in FIGURES 1-4. A plurality of clamping dogs 104 are provided substantially circumscribing the flanges 103 and 105. The detailed geometry of the clamping dogs 104 and the sleeve 106 in this connector differ from the geometry of the analogous parts in the other illustrated embodiments but the essential functions of the various parts remain the same.

A camming surface 108 is provided between the shaft 101 and the flanged end 103 in a manner analogous to the caming surface or fillet 26 in the connector 10. This camming surface 108 provides an externally directed radial camming force on the dogs 104 when a tensile load is applied to the connector 93. The clamping dogs substantially circumscribe the flanged ends 103 and 105 and cooperate therewith to transmit the longitudinal tensile force therebetween. The dogs are provided with an external circumferentially extending cylindrical bearing surface 110 and an external circumferentially extending rebated portion or recess 112. The recess 112 and the bearing portion 110 each have at least a portion extending axially further from the first shaft 94 than the camming surface 108 is from the first shaft. An end 114 of the sleeve 106 cooperates with the bearing surface 110 of the clamping dogs 104 to constrain the dogs in securing relationship to the flange or head 103. When the sleeve 106 is slidably positioned away from the first shaft 94, the end 114 of the sleeve 106 no longer cooperates with the bearing surface 110. The bearing surface 110 then cooperates with a recess 116 in the internal surface of the sleeve 106. The recess 112 in the clamping dogs 104 provides a clearance for a portion 118 of the sleeve 106 which constrains outward movement of an edge 120 of the clamping dogs 104. This clearance and that provided by the recess 116 for the bearing portion 110 of the clamping dogs 104 permits outward pivotal movement of the clamping dogs 104 when the sleeve 106 is moved away from the shaft 94. The mode of operation of the embodiments of FIGURES 6 and 7 are similar to that of the first described connector and similar efficient results are obtained.

An additional feature is illustrated in the connector 93 shown in FIGURE 7 not shown in the embodiments previously illustrated. A circumferentially extending spring 119 is provided in a recess in one end of the dogs 104. This spring urges the dogs toward a central position which would bring them into engagement with the flange 103 when the shaft 101 is present in the connector. Since the dogs 104 form nearly a complete circle, there is no collapse of the assemblage of dogs when no shaft is present in the connector. This connector is operated in a manner analogous to the previously described mode of operation in order to connect the tank 102 to the supporting structure 98. The sleeve 106 is slidably moved to a position away from the shaft 94 wherein the cylindrical bearing portion 110 of the dogs 104 is adjacent to the recessed portion 116 of the sleeve. In this position the shaft 101 can be inserted into the connector and the flanged end 103 operating against a conical portion 121 of the dogs overcomes the urging force of the spring 119 thereby pivoting the dogs radially outwardly to allow complete insertion of the shaft. When the flange 103 abuts the flange 105 on the first shaft 94 the circumferentially extending spring pivotally urged the dogs into securing engagement with the flange 103. The sleeve can then be allowed to return to its normal closed or constraining position. Similar urging springs could readily be applied to the other embodiments if desirable in any particular application.

Although only certain embodiments have been set forth, it is apparent that various changes and modifications may be made by one skilled in the art without departing from the scope of this novel concept. It is to be understood that the above is by way of illustration only and is not to be taken by way of limitation, the spirit and scope of this invention being limited only by the terms of the claims.

What is claimed is:

1. A quick-releasing high strength connector comprising:
    a first support rod comprising a body portion, a first head in the form of a right circular cylinder affixed to the body portion and an arcuate concave fillet between said head and said body portion,
    a second support rod coaxial with the first rod comprising a second body portion, a second head in the form of a right circular cylinder affixed to the second body portion and an angularly disposed fillet between said head and said body portion,
    said first and second heads mutually abutting,
    a plurality of floating annular segmented clamping dogs collectively substantially circumscribing said cylindrical heads and adapted for engaging relationship therewith comprising arcuate convex edge means cooperating with said arcuate concave fillet for fulcruming said dogs, tapered cam means cooperating with said angularly disposed fillet for transmitting a force therebetween and further for directing a force sufficient for camming said dogs toward a disengaged position and an outer portion in the form of a right circular cylindrical surface,
    said outer cylindrical surface being located further axially from said first shaft than the camming surfaces are axially from said first shaft;
    an axially slidably movable sleeve circumscribing said dogs comprising a right circular cylindrical surface cooperating with the cylindrical surface of the clamping dogs when the dogs are in an engaged position with said mutually abutting heads to secure the dogs in said engaged position;
    said clamping dogs further comprising an external circumferentially extending rebated portion extending further axially from said first shaft than the camming surfaces are axially from said first shaft and cooperating with one end of said sleeve when the sleeve is slidably moved in one direction to allow said clamping dogs to pivotally move into a disengaged position,
    and means for urging said slidably mounted sleeve towards a position in which said cylindrical surface of the sleeve constrains the dogs in engaged position.

2. A quick-releasing high tensile strength connector comprising first and second mutually abutting coaxial shafts having respectively first and second flanges on abutting ends thereof,
    a fillet between said second shaft and the second flange tapered at an angle with respect to the abutment of said flanges greater than the friction angle,
    a plurality of floating clamping dogs each in the form of longitudinal segments of an annular figure of revolution said dogs collectively substantially circumscribing said flanges, each of said dogs having a first ear in fulcrumed engagement with said first flange and a second ear engaged with said fillet for securing said shafts together, each of said dogs having a circumferentially extending external recessed portion and a circumferentially extending external cylindrical portion, said cylindrical portion being located entirely further axially from said first shaft than said fillet means is axially from said first shaft, an axially shiftable sleeve circumscribing said dogs cooperating with said cylindrical portions for holding said dogs in engagement with said fillet and with said first flange, whereby the fillet cooperates with the clamping dogs when the connector is under tension to cam the dogs into a disengaged position when the sleeve is shifted relative to said dogs.

3. A connector as defined in claim 2 wherein said recessed portion comprises a first surface in the form of a steep cone and a second surface in the form of a shallow cone coaxial with said first cone, said first surface and said second surface forming an angle of substantially 90°.

4. A quick releasing high tensile strength connector comprising:
   a first support rod comprising a body portion, a first head in the form of a right circular cylinder affixed to the body portion and an arcuate concave fillet between said head and said body portion;
   a second support rod co-axial with said first rod comprising a second body portion and a second head in the form of a right circular cylinder affixed to the second body portion, said first and second heads mutually abutting;
   a plurality of floating clamping dogs collectively substantially circumscribing said cylindrical heads and adapted for engaging relationship therewith, each of said dogs comprising a segment of an annular figure of revolution having arcuate convex edge means cooperating with said arcuate concave fillet for fulcruming said dog, an outer portion in the form of a right circular cylindrical surface and an external circumferentially extending rebated portion;
   camming means responsive to an axial tensile load on the rods for camming the dogs into disengagement from said second rod by pivotal movement about said convex edge means comprising a tapered cam surface between said second body portion and said second head and a mating cam surface on said clamping dogs, both of said cam surfaces being in the form of a cone extending inwardly of said rods and away from said first rod and having an angle between said surfaces and the transapical plane of the cone of from 12° to 15°;
   an axially slidably movable sleeve circumscribing said dogs comprising a right circular cylindrical surface cooperating with the cylindrical surface of said clamping dogs when the dogs are in an engaged position with said mutually abutting heads to secure the dogs in said engaged position and an end portion cooperating with said rebated portion on said dogs when the sleeve is slidably moved in one direction to allow said clamping dogs to pivotally move into a disengaged position;
   means for urging said slidably movable sleeve towards a position in which said cylindrical surface of the sleeve constrains the dogs in engaged position;

said rebated portion on said dogs comprising a first surface in the form of a steep cone and a second surface in the form of a shallow cone co-axial with said first cone, said first surface and said second surface forming an angle of substantially 90°, said rebated portion extending further axially from said first rod than said camming means is axially from said first rod.

5. A quick-releasing high strength connector comprising:
   first and second mutually aligned shafts having mutually aligned abutting flanged ends each providing a bearing shoulder, the bearing shoulder on said first shaft having a first camming surface in the form of a cone extending inwardly of said shafts and away from said second shaft;
   a plurality of floating dogs each extending circumferentially of said flanged ends and all collectively substantially circumscribing the entire periphery of said flanged ends, each of said dogs having a first ear engaged with said second shaft end, said first ear having a second camming surface mating with said first camming surface for cooperating with said first shaft end for providing a sufficient camming force on said dogs when said shafts are under a tensile load to disengage said dogs from said first shaft;
   an axially slidable sleeve surrounding said dogs for restraining outward movement of said dogs, said sleeve having at least two bearing contact surfaces with each of said dogs when said dogs are engaged with both of said shafts, each of said bearing contact surfaces being further axially from the abutment of said two shaft ends than the engagement of said ears with said shaft ends are from the abutment of said two shaft ends so that a minimal radial force exists at the interface of said second ear and said second shaft end;
   each of said dogs comprising an external circumferentially extending rebated portion intermediate the bearing surfaces and immediately adjacent thereto, the edges of the rebated portion also being further axially from the abutment of said two shaft ends than the engagement of said ears with said shaft ends are from the abutment of said two shaft ends.

References Cited by the Examiner

UNITED STATES PATENTS

| | | | |
|---|---|---|---|
| 938,534 | 11/1909 | Whitney | 279—37 |
| 2,448,817 | 9/1948 | McArthur | 287—20.5 |
| 2,507,127 | 5/1950 | True | 294—86.33 X |
| 2,614,781 | 10/1952 | Engel | 287—20.5 |
| 2,773,437 | 12/1956 | Knauf | 279—37 |
| 2,951,274 | 9/1960 | Elsner | 24—211 |
| 2,952,482 | 9/1960 | Torres | 285—320 X |
| 3,028,179 | 4/1962 | Abramoska | 285—320 X |
| 3,077,330 | 2/1963 | Lamphear | 285—86 X |
| 3,096,999 | 7/1963 | Ahlstone | 285—315 |

FOREIGN PATENTS 847,163  6/1939  France.

CARL W. TOMLIN, *Primary Examiner.*